United States Patent [19]
Masse et al.

[11] 3,846,836
[45] Nov. 5, 1974

[54] LOADING AND UNLOADING MECHANISM FOR FLEXIBLE MAGNETIC DISKS

[75] Inventors: Philip R. Masse; William J. Pendy; William S. Wentink, all of Rochester, Minn.

[73] Assignee: International Business Machines Corporation, Armonk, N.Y.

[22] Filed: Aug. 30, 1973

[21] Appl. No.: 393,246

[52] U.S. Cl. .................................. 360/98, 274/10 D
[51] Int. Cl. .......................................... G11b 17/00
[58] Field of Search ............... 360/8, 93, 97, 98, 99, 360/133, 135; 274/10 D; 312/15, 17, 18, 19; 221/134, 259

[56] References Cited

UNITED STATES PATENTS

| | | | |
|---|---|---|---|
| 2,396,411 | 3/1946 | Cameron | 274/10 |
| 2,690,913 | 10/1954 | Rabinow | 274/10 |
| 3,070,374 | 12/1962 | Nakamatsu | 274/10 |
| 3,456,951 | 7/1969 | Rhoades | 274/10 |

*Primary Examiner*—Vincent P. Canney
*Attorney, Agent, or Firm*—Keith T. Bleuer

[57] ABSTRACT

Mechanism for loading and unloading flexible disks contained in protective envelopes into and from a data recording and reading device for the disks which holds the disks vertically between a drive element and an arbor rotatable on horizontal axes. The mechanism comprises a bin located on top of the recording and reading unit and having a hopper section and a stacker section. Rotatable pick and feed rolls feed a disk in its protective envelope out of the hopper section and downwardly into the recording and reading unit; and, after information has been either read from or recorded on the disk, vertically movable lifter fingers move the disk and protective envelope upwardly to the feed roll which transfers the disk in its envelope into the stacker section of the bin.

13 Claims, 18 Drawing Figures

PATENTED NOV 5 1974 3,846,836

SHEET 6 OF 7

LOADING AND UNLOADING MECHANISM FOR FLEXIBLE MAGNETIC DISKS

BACKGROUND OF THE INVENTION

The invention relates to magnetic record disks particularly those encased in protective envelopes. Still more particularly, the invention relates to means for loading and unloading such magnetic disk assemblies into and from a magnetic recording and reading unit.

Magnetic disks encased in rigidifying and protecting envelopes have previously been proposed, for example, in U.S. Pat. No. 3,668,658. Recording and reading mechanism for a magnetic disk cartridge has also been proposed as in U.S. Pat. No. 3,593,327. In the latter patent, a magnetic disk cartridge is insertable through a slot into a drive housing, and such insertion opens a shutter in the cartridge and unlocks a lowering mechanism. Closing of a door to the slot lowers the cartridge to set the memory disk on to a drive spindle where it is held magnetically. Operation of the drive mechanism then locks the door closed and locks the cartridge down. This insertion of the cartridge into the machine is by hand; and, when another disk is to be read or recorded upon, the first disk cartridge is withdrawn manually from the machine and a second is inserted manually into the machine.

SUMMARY OF THE INVENTION

It is an object of the present invention to provide improved loading and unloading mechanism for disk-envelope assemblies whereby the assemblies are fed consecutively from a bin into a recording and reading unit located below the bin and whereby, prior to the feeding of a following disk-envelope assembly, a prior assembly is fed upwardly back into a stacker portion of the bin.

In a preferred form, the loading and unloading mechanism of the invention includes a bin for holding disk-envelope assemblies in stacked relationship and located above a disk reading-recording unit. The bin includes a hopper portion and a stacker portion, and the bottoms of both of these portions are slanted downwardly so that the disk-envelope assemblies tend to move toward one end of the bin. A pick roll is rotatably mounted medially in the bottom of the bin and is rotatable through about 100° so as to move the lower edge of a disk-envelope assembly in the hopper portion of the bin over the pick roll and on to a rotating friction feed roll and thereby downwardly into the recording-reading unit. The unit includes a movable cover which carries a rotatable arbor, and the mechanism includes means for closing the cover and moving the arbor through the central opening of the disk so as to clamp the disk with respect to the arbor and to a drive member. The reading or recording action may then take place. The unit includes a pair of lifter fingers, and these move upwardly after the reading or recording action has been completed and the cover has been reopened so as to move the disk assembly again into contact with the feed roll, and the feed roll pulls the disk assembly upwardly and moves it over the feed roll into the stacker section of the bin.

DESCRIPTION OF THE PREFERRED EMBODIMENT

Figure 1:
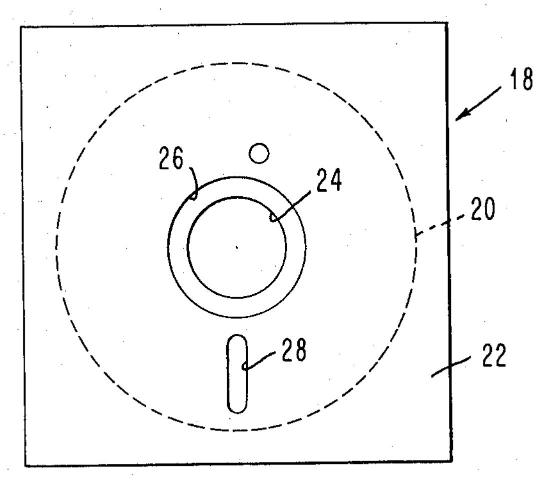
FIG. 1 is a plan view of a disk-envelope assembly which may be used in the disk reading and recording unit to which the loading and unloading mechanism of the invention is affixed.
Figure 2:
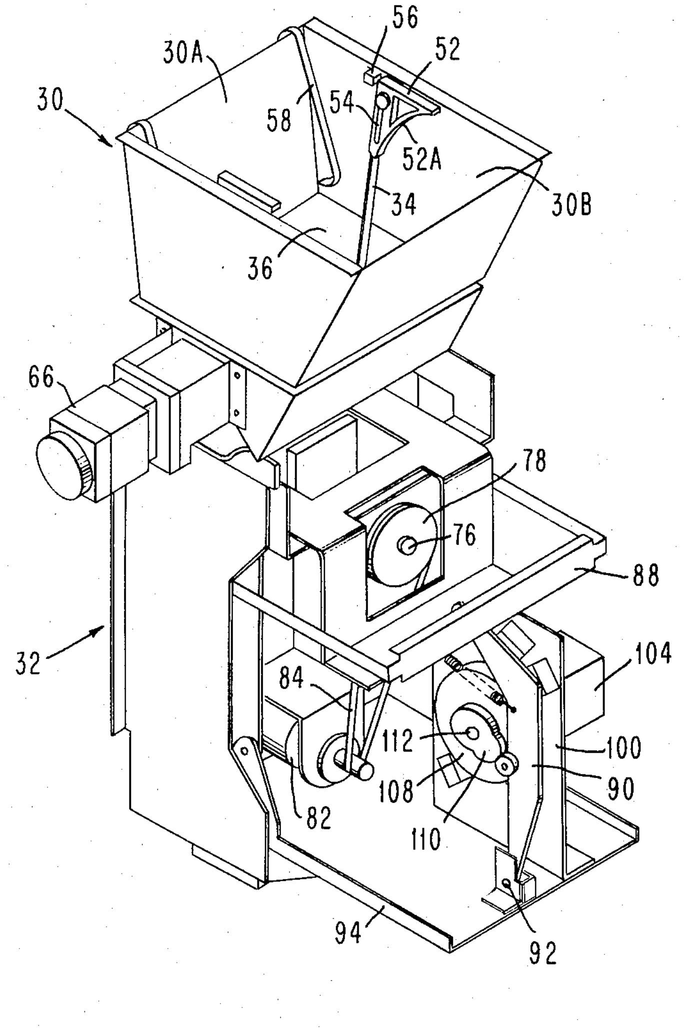
FIG. 2 is a perspective view of the disk reading and recording unit having a bin on its top and incorporating the loading and unloading mechanism of the invention.

Referring now to FIG. 1, in particular, the magnetic disk assembly 18 utilized by the automatic loader of the invention may be seen to comprise a magnetic disk 20 disposed within a protective square envelope 22. The disk 20 is of a suitable thin flexible material, and the envelope 22 may be of rigid vinyl sheet material of 0.010 inch thickness, for example. The disk 20 has a central opening 24, and the envelope 22 has larger central openings 26 in its two thicknesses. In addition, the envelope 22 has radial slots 28 in its two thicknesses. An assembly of this type is disclosed in U.S. Pat. No. 3,668,658 issued June 6, 1972, which may be referred to for more detail.

The automatic loader of the invention comprises a bin 30 for receiving the assemblies 18 and located on top of and supported by a disk drive unit 32.

The bin 30 has a pair of disk assembly separators 34 on opposite sides thereof, and the separators 34 divide the bin 30 into a hopper 30A and a stacker 30B. The bin 30 has a bottom 36 which slants downwardly from one side of the bin to the other, from hopper 30A to stacker 30B. The inner surfaces of the bottom 36 provide a downwardly extending ramp 36A for the hopper 30A and a downwardly extending ramp 36B for the stacker 30B. Pads 37 of low friction material are fixed to the bottom 36.

A pair of feed rolls 38 fixed on a shaft 39 and a pair of pick rolls 40 fixed on a shaft 41 are rotatably disposed by means of these shafts in opposite sides of the bin bottom 36. The rolls 38 and 40 are disposed in slots 42 provided in the bottom 36. An annulus or bearing 43 has a nip with each of the feed rolls 38 and is rotatably disposed on the shaft 41.

The feed rolls 38 are provided with flippers 44 fixed thereto adjacent opposite ends of the shaft 39. Each of the separators 34 has a pivotal connection 46 with an arm 48 fixed to the pick roll shaft 41, and each separator 34 has a return bent shield portion 50 which is located closer to the adjacent feed roll 38 than is the major portion of the separator. The pick rolls 40 are each provided with a radially extending ledge 40A located adjacent to the pivotal connection 46 with a separator 34. The ledges 40A have a depth slightly less than the thickness of the assembly 18. The rotary motion of the pick rolls 40 is limited to about 100° by means of pairs of dowels 48A and 48B extending inwardly from the sides of the bin 30 and located so that an arm 48 may contact the dowels.

Each of the separators 34 at its upper end is connected to a reciprocable guide member 52 that has a pin and slot connection 54 with the adjacent side of the bin 30. Each of the reciprocating members 52 has a curved portion 52A that overlies the stacker 30B and has a pick edge 52B on its opposite side. A throat knife or block 56 is located on each of the sides of the bin 30 adjacent to the pick edge 52B of the associated separator 34.

A pair of support springs 58 extend down into the hopper 30A and overlie the adjacent upper edge of the bin 30. A stacker switch 60 and a hopper switch 62 are respectively disposed on the ramps 36B and 36A forming the bottoms of the stacker and hopper; and a jam switch 64 is disposed below the bite of one of the rolls 38 and a bearing 43.

The feed rolls 38 are driven from a reversible drive electric motor 66 through shaft 39. The rolls 38 and 40 are drivingly coupled together by means of a magnetic slip clutch 68 and a pair of intermeshing gears 70 and 72. The gear 72 is fixed on shaft 39, and gear 70 drives shaft 41 through clutch 68.

The disk drive unit 32 comprises a vertical disk assembly support 74 having a shaft 76 rotatably disposed therein. A pulley 78 is fixed on one end of the shaft 76 and the other end of the shaft 76 is formed with a radially extending disk drive hub portion 80 surrounding a countersunk opening 81. A drive motor 82 is fixed with respect to the part 74, and a drive belt 84 extends between the motor 82 and the pulley 78.

A door or cover 86 is swingably mounted with respect to the part 74 by means of pins 87 extending through clearance holes 87A in cover 86, and a U-shaped actuator 88 is swingably mounted on the cover 86. A lever 90, which is swingably mounted at one end at 92 with respect to a stationary base 94, has its other end swingably connected with the actuator 88. A tapered collet or arbor 95 is rotatably carried by the cover 86 and is so shaped and located that it will fit in the opening 81 when the cover is moved toward or closed with respect to the support 74. A disk lifter lever 96, which is pivoted at 98 to a vertical standard 100, has a pair of spaced fingers 102 that extend through correspondingly spaced openings 103 in the support 74 so that the fingers 102 underlie and support a disk assembly 18 which is positioned within the support 74.

A motor 104 is fixed to the standard 100 and has cams 106, 108 and 110 fixed on its output shaft 112. The lifter lever 96 has a follower roller 114 on one end that cooperates with the cam 106, and the lever 90 has a follower roller 116 that cooperates with the cam 110. A motor reverse switch 118, an unload home switch 120 and a load home switch 122 are fixed to the standard 100; and these cooperate with the cam 108.

Information is written on or read from a disk 20 by means of a magnetic head 124 moved vertically by means of a lead screw 126. The screw 126 may be driven by any suitable motor (not shown). A pressure pad assembly 128 is positioned opposite the head 124 and holds a disk 20 in contact with the head 124.

When a disk assembly 18 is located in the unit 32, the disk assembly 18 lies in vertical slots 74A and 74B in support 74, and the collet 95 extends through the disk opening 24 and into the countersunk opening 81 in the end of the shaft 76. The disk 20 is clamped between the collet 95 and the hub portion 80, and the motor 82 drivingly rotates the disk 20. At this time, information is read from and written on the magnetic disk 20 using the magnetic head 124 and connections thereto (not shown), with the magnetic head 124 operating through one of the elongate slots 28 to be in contact with a surface of the disk 20.

Figures 4, 5, 6, 7, 8:
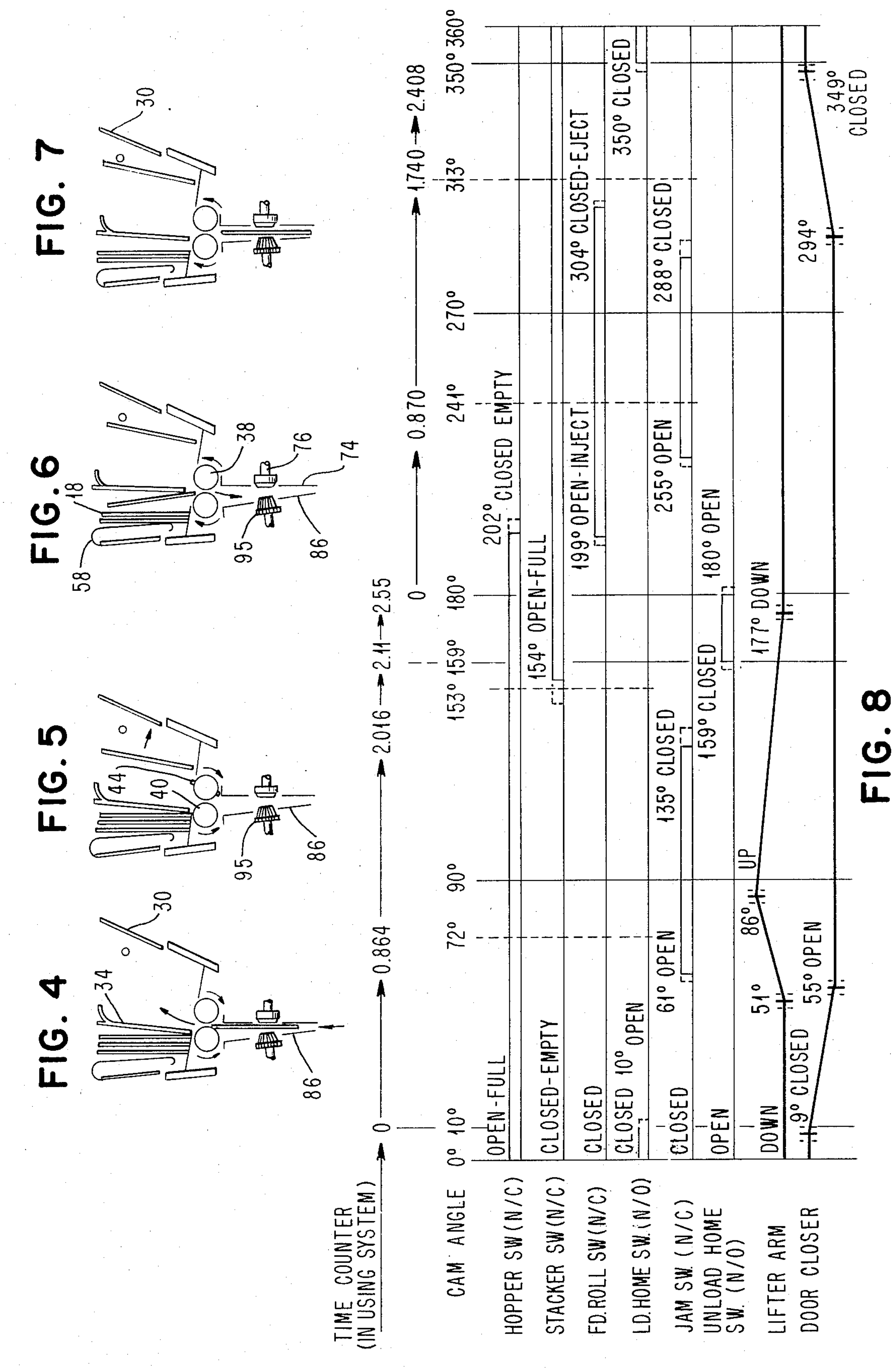
FIGS. 4, 5, 6 and 7 are schematic illustrations showing various stages in the operation of the loading and unloading mechanism.
FIG. 8 is a diagram showing the relationship between the states of various electrical switches, etc., with respect to the relative positions of the parts illustrated in FIGS. 4, 5, 6 and 7 located above FIG. 8.
Figure 9:
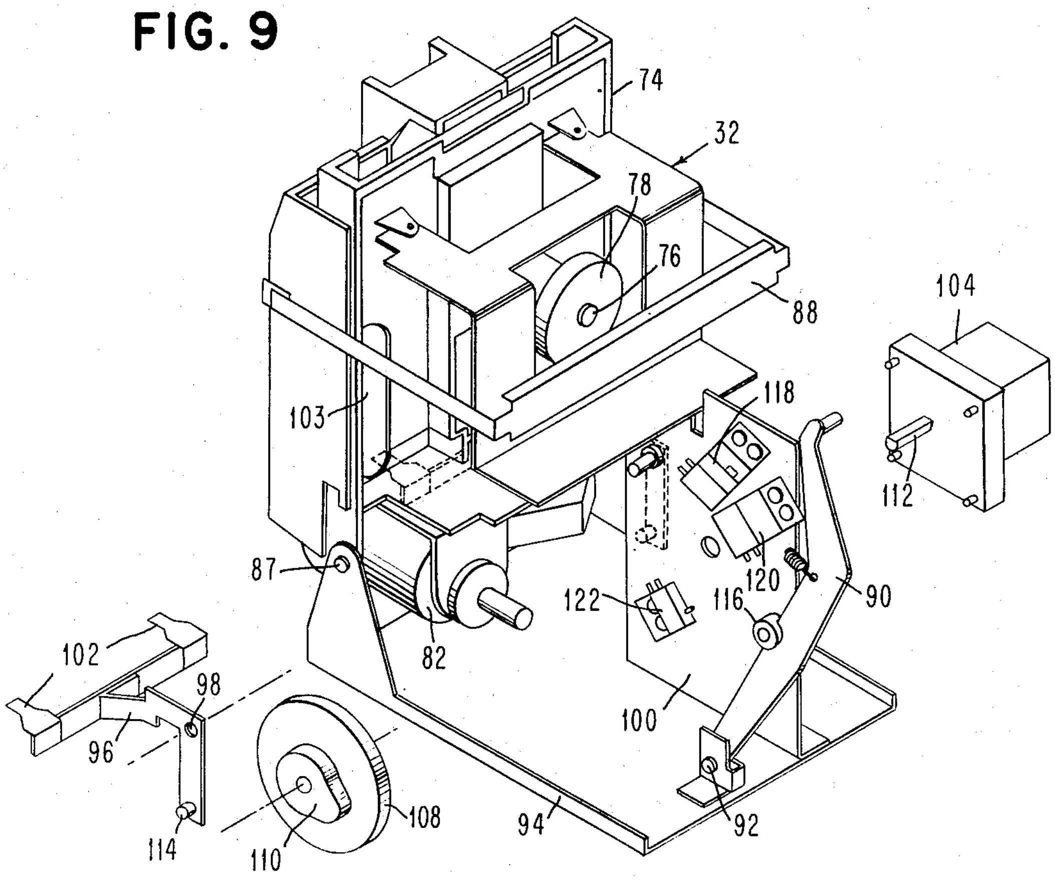
FIG. 9 is a perspective view of the reading-recording unit with various parts being exploded from the unit so as to clearly illustrate other parts of the unit.
Figure 14:
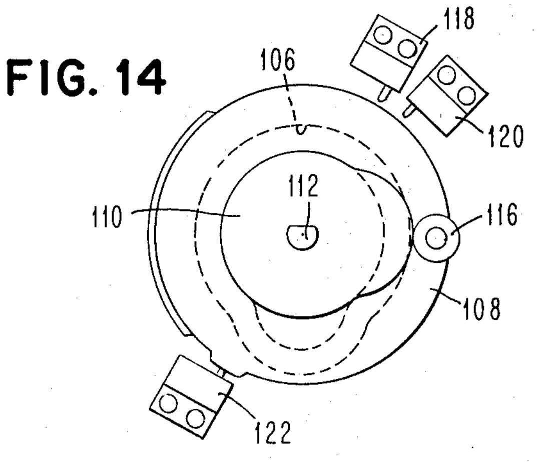
FIGS. 14 and 15 are side elevational views (taken from opposite sides) of certain cam mechanism carried by the recording-reading unit.
Figure 15:
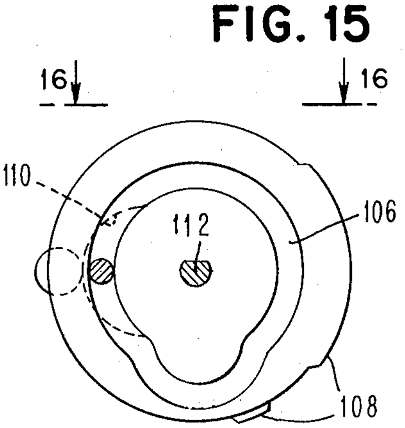
Figure 16:
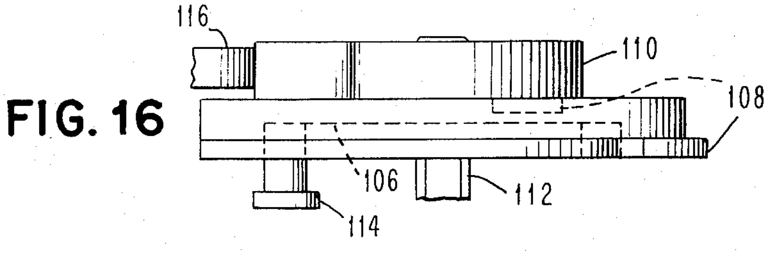
FIG. 16 is a top plan view of the cam mechanism taken on line 16—16 of FIG. 15.
Figure 10:
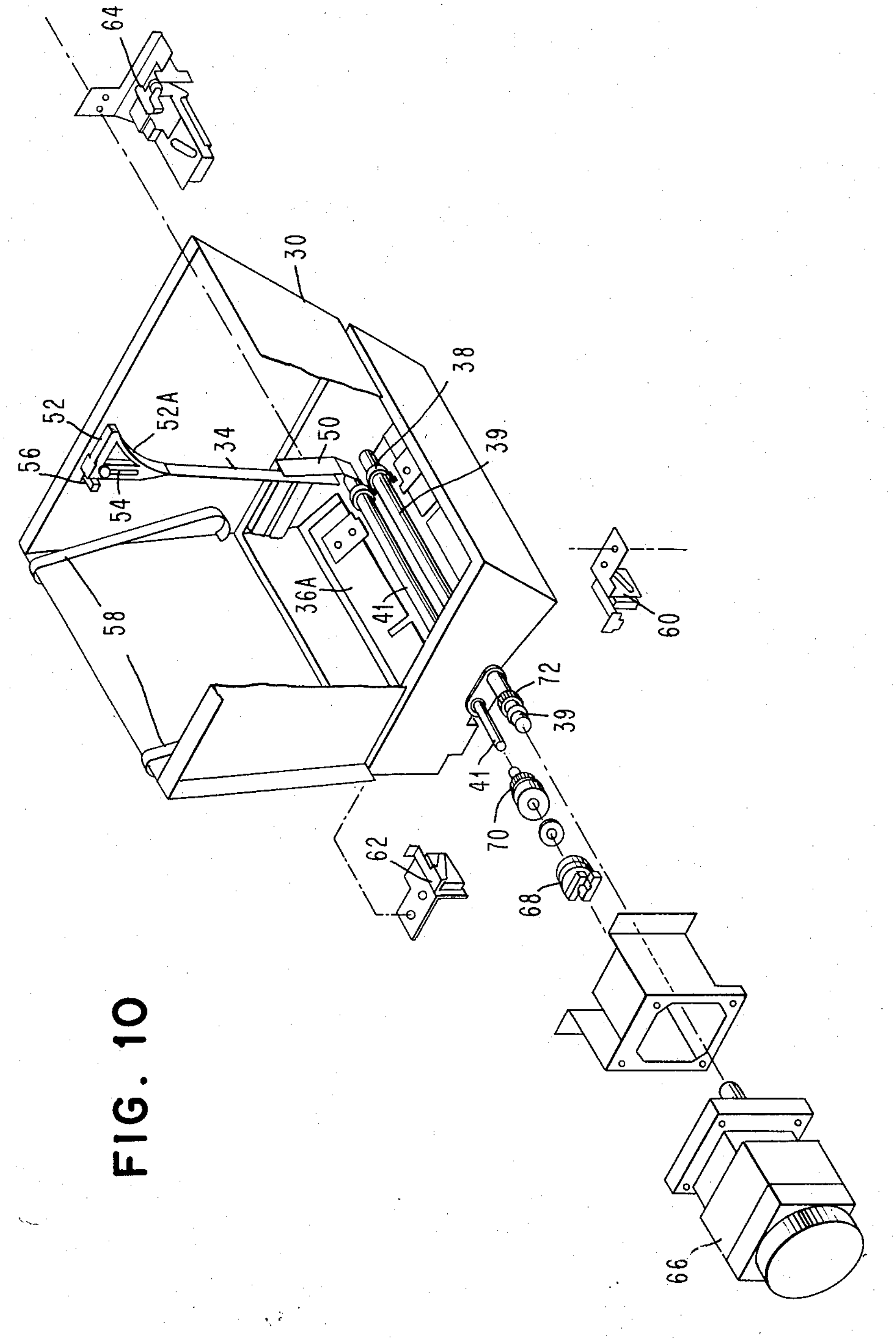
FIG. 10 is a perspective view of the bin, with various parts being exploded therefrom so as to clearly illustrate other parts.
Figure 11:
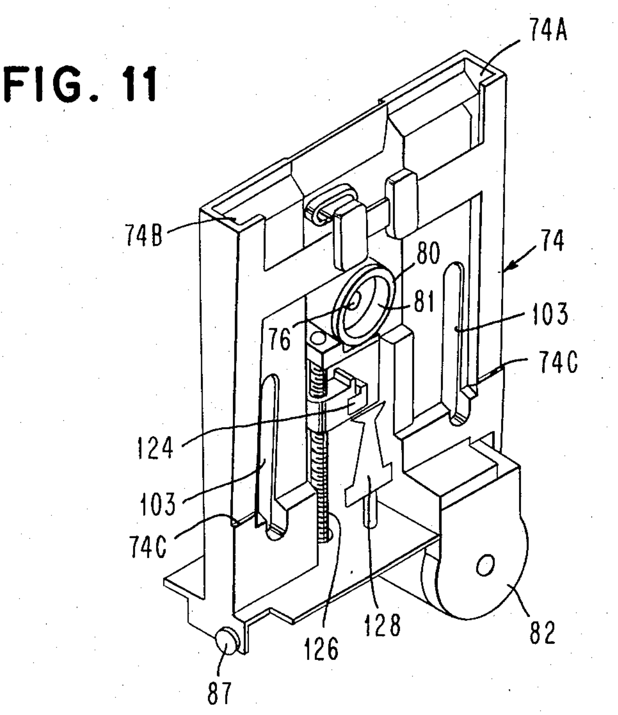
FIG. 11 is a perspective view of a frame within the recording-reading unit for receiving each of the disk-envelope assemblies as the disk-envelope assembly is moved downwardly from the bin into the unit.
Figure 12:
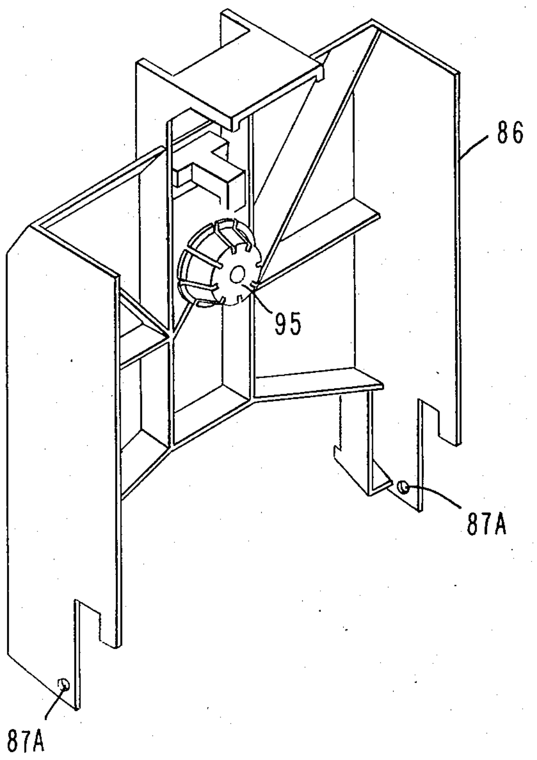
FIG. 12 is a perspective view of a cover carrying a rotatable arbor and swingable toward the frame of FIG. 11 so as to clamp a magnetic disk in position for reading from or recording on the disk.
Figure 13:
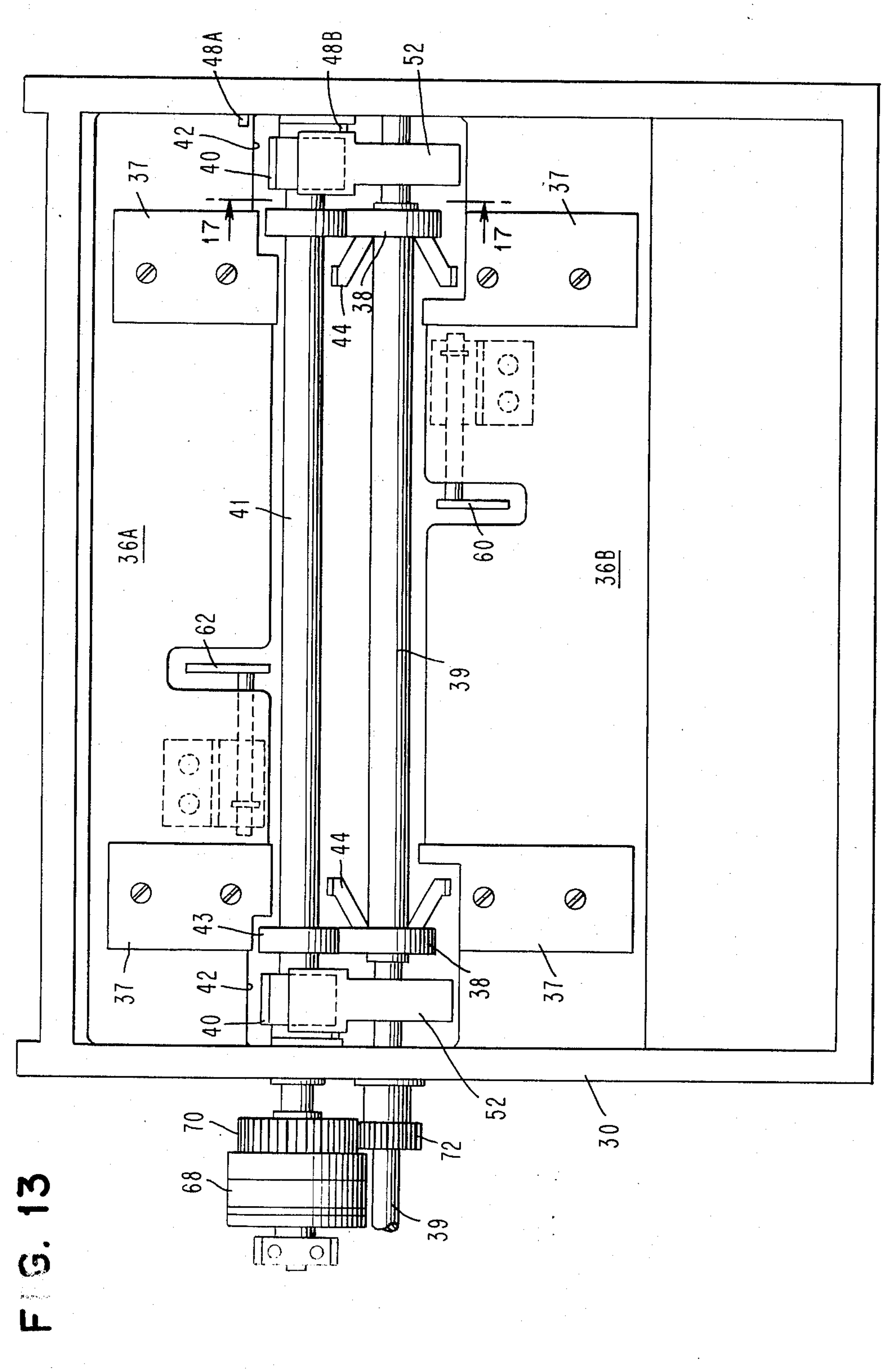
FIG. 13 is a top plan view of the bin.

After these operations, the motor 104 is energized so as to drivingly rotate the cams 106, 108 and 110. As is illustrated in FIGS. 4 and 8, after a 10° rotation of these cams; the door 86 begins to swing open. In particular, this is due to the action of the cam 110 on the swing arm 90 that is coupled to the door 86 through the actuator 88. The load home switch 122 is actuated by the cam 108 at 10° rotation, and this switch may be used for starting a counter in an attached computer (not shown).

At about the time that the door 86 is completely open (at 51° rotation of the cams), the lifter lever 96 begins to lift the disk assembly 18 upwardly in the unit 32; and the assembly 18 actuates the jam switch 64 as the assembly 18 moves toward the bite between the rolls 38 and bearings 43. At 72° rotation of the cams, a check may be made to determine if the jam switch 64 is open. If the switch 64 has not been opened by the assembly 18 moving upwardly, the operation should be stopped and the motor 104 should be de-energized at this time.

When the lifter arm 96 reaches its highest position, the disk assembly 18 is fed into the bite between the rolls 38 and bearings 43; and, in particular, the disk assembly 18 moves upwardly between the rolls 38 and bearings 43 starting at about 86° of cam rotation (see FIG. 8). The feed rolls 38 are driven from the motor 66 through the shaft 39, and rolls 38 move the assembly 18 upwardly into the stacker 30B and into contact with the separators 34 and into contact with the curved surfaces 52A of the guide members 52. The curved surfaces 52A direct the upper edge of the assembly 18 downwardly, toward the lower end of the bin 30. When the lower edge of the assembly 18 passes through the nip of the rolls 38 and bearings 43, the flippers 44 engage the bottom edge of the assembly 18 and move it across the rolls 38 on to the ramp 36B. The assembly 18 then slides downwardly on the ramp 36B of the stacker 30B (see FIG. 5) until the assembly 18 contacts the end of the bin 30 at the end of the ramp 36B or else contacts one or more assemblies 18 that have been previously put into the stacker 30B. This assembly 18 thus either begins or continues the filling action of the stacker 30B. This unloading cycle ends at about 159° of cam rotation (see FIG. 8).

Figures 3, 17, 18:
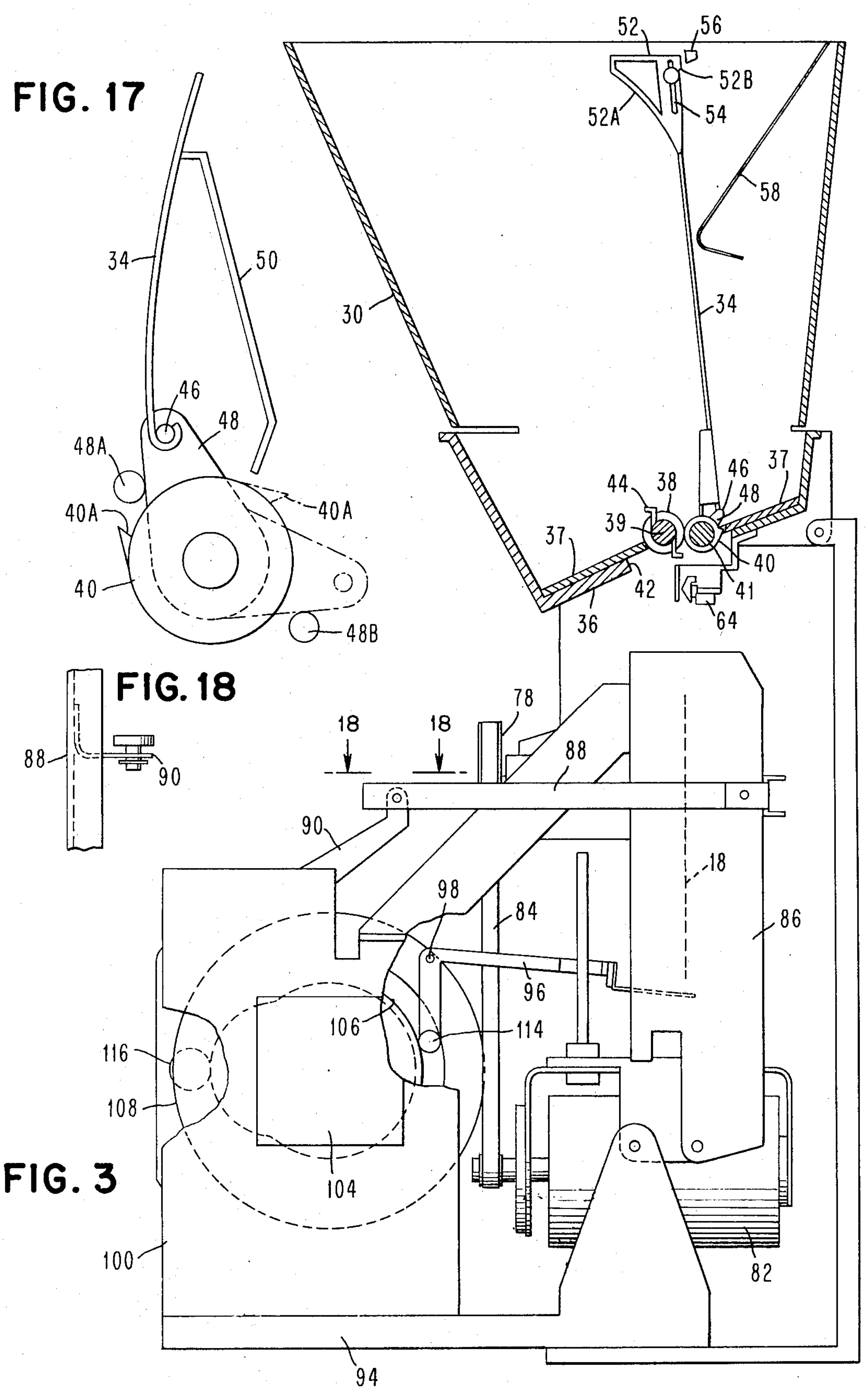
FIG. 3 is a side elevational view of the reading-recording unit, with the bin being shown in vertical section thereabove.
FIG. 17 is a sectional view on an enlarged scale taken on line 17—17 of FIG. 13.
FIG. 18 is a top plan view of a certain mechanical connection in the reading and recording unit and taken from line 18—18 of FIG. 3.

The flippers 44 are of yieldable material so that the flippers 44 yield as they strike the assembly 18 as it moves upwardly between the rolls 38 and bearings 43, prior to the lower edge of the assembly 18 passing through the bite between the rolls 38 and bearings 43. The shield portions 50 of the separators 34 are located just above the pick rolls 40 (in their FIG. 3 positions) and are at the limit of their movement in the clockwise direction as seen in FIG. 3 as an assembly 18 moves into the stacker 30B as just described, so as to assure that the assembly 18 cannot fall back into the bite between the rolls 38 and bearings 43 even though the flippers 44 may have some lack of registration with the bottom edge of the assembly 18 as the assembly is being moved over the rolls 38 by the flippers 44. It should be noted that the motor 66 is in direct drive with the feed rolls 38 and thereby drives these rolls as long as the motor 66 is energized. The pick rolls 40 are driven through the gears 70 and 72 and the magnetic clutch 68 so that the rolls 40 may be stationary even though the feed rolls 38 are in continuous rotation. The magnetic clutch 68, during the unloading operation as just described, urges the pick rolls 40 and shaft 41 in the clockwise direction as seen in FIG. 3; and rolls 40 are at this time held in their FIG. 3 positions by one of the arms 48 bearing against the dowel 48A. The clutch 68 may be a hysteresis type of magnetic clutch and continuously slips.

A load cycle commences at 180° of rotation of the cams 106, 108 and 110 under the driving action of the motor 104 (see FIG. 6). A collection of the disk assemblies 18 is held in contact with the separators 34 in the hopper 30A by means of the support springs 58. During the continued rotation of the cam 108, the feed roll switch 118 is opened (at 199° of rotation of the cam 108), and the effect of the opening of the switch 118 is to reverse the direction of drive of the motor 66 and thereby reverse the direction of rotation of the rolls 38 and shaft 39. Pick rolls 40 and shaft 41 then rotate in the counterclockwise direction as seen in FIG. 3 under the driving action of gears 70 and 72 and of clutch 68. This rotation of shaft 41 and thus of arms 48 moves the separators 34 downwardly with respect to the ramp 36A, with the dowel 48B being contacted by one of the arms 48 and thus limiting rotation of the shaft 41. During this rotation of the shaft 41, the ledges 40A on the pick rolls 40 contact the lower edge of a disk assembly 18 and move the lower edge of this assembly 18 over the rolls 40 and bearings 43, and into the bite between the rolls 38 and bearings 43. It is important that the clutch 68 be of the slip type to allow for low acceleration starting, yet assure positive drive of the shaft 41; so that, when the pick rolls 40 begin their motion, they will not dislodge the disk assembly 18 from the ledges 40A.

The feeding of more than one of the disk assemblies 18 at a time out of the hopper 30A into the bite between the rolls 38 and bearings 43 is prevented by the edges 52B on the members 52 and the throat blocks 56. The edges 52B have a thickness only slightly less than the thickness of an assembly 18, and the throat blocks 56 are separated from the bottom surfaces of the edges 52B by a distance only slightly greater than the thickness of an assembly 18. Therefore, as the parts 52 reciprocate upwardly as the pick rolls 40 initially rotate in the counterclockwise direction as seen in FIG. 3, only a first disk assembly 18 in a stack of the assemblies 18 in the hopper 30A may move across the pick rolls 40 and into the nips between the rolls 38 and bearings 43. The blocks 56 prevent upward movement of the subsequent ones of the disk assemblies 18 with the hopper 30A and hold the subsequent disk assemblies from moving across the rolls 40. The disk assembly 18 entering the bites between the rolls 38 and bearings 43 moves downwardly into the slots 74A and 74B, and this downward movement of an assembly 18 is completed between 288° and 294° of the cams 106, 108 and (see FIG. 8). The assembly 18 leaves the bites of the rolls 38 and bearings 43 and drops downwardly to the limit of its movement in the support 74 into contact with ledges 74C at the bottoms of slots 74A and 74B. The lifter arms 102 are, during this phase of the operation, located just below ledges 74C at the lower most limits of their movement. The opening 24 in the disk 20 then is approximately in alignment with the collet 95 and with the center of the shaft 76.

As the assembly 18 moves downwardly through the nips between the rolls 38 and bearings 43, the assembly 18 actuates the jam switch 64. It will be observed from FIG. 8 that the jam switch is open between about 225° and 288° of rotation of the cams 106, 108 and 110. At 241° rotation of the cam 108, a check may be made to determine if the jam switch is closed; if it is closed, the operation is stopped. If the disk assembly 18 being fed at this time is the last disk assembly 18 within the hopper 30A, the hopper switch 62 is closed at this time; and this has the effect of preventing any subsequent disk assembly feeding action by the rolls 38.

At 294° rotation of the cams 106, 108 and 110, the cover 86 begins to close (see FIGS. 7 and 8), this being under the action of the cam 110 effective on the swinging arm 90. At this time, the disk assembly 18 is resting on the lifter fingers 102, and its central opening 24 is approximate alignment with the collet 95. During continued rotation of the cam 108, the switch 118 is closed; and this has the effect of reversing the drive of the motor 66 and reversing the direction of rotation of the rolls 38. The separators 34 and the pick rolls 40 are thus moved back to their starting positions in which they are illustrated in FIG. 3. At 313° rotation of the cam 108 under drive by the motor 104, a check is made to determine if the jam switch 64 is open. If the jam switch 64 is open, the operation stops.

At 349° movement of the cams 106, 108 and 110 (see FIG. 8), the cover 86 is completely closed; and the load home switch 122 is actuated by the cam 108. The actuation of the switch 122 has the effect of deenergizing the motor 104 and also notifies the using system that a disk assembly 18 is loaded. At this time, the disk 20 of an assembly 18 is gripped between the collet 95 and the surface 80, and the motor 82 drives the disk 20 so that information may be either read from or written on the disk.

It will thus be apparent that the bin 30 and associated structure constitutes an automatic loader for the disk drive unit 32, loading and unloading the flexible disks 20 (including the protective envelopes 22) into the disk drive unit 32 where the disks can be written upon or read.

The hopper 30A of the bin 30 may simply be loaded with the assemblies 18 in a stack; and the machine may then be left unattended, if desired, allowing the attached computer or other machine to control the motors 66 and 104 in such a manner that successive disks 20 are processed by the disk drive unit 32. The data to be recorded or read from each of the disks 20 may be quite variable; but, regardless of this fact, using the attached machine or computer to so control the motors allows all of the disks 20 within the hopper 30A to be processed without operator attention. Using this mode of control, the operator need only check periodically to ensure that the hopper 30A and stacker 30B are properly filled or emptied. In addition, as the autoloader operates, additional assemblies 18 may be added to the hopper 30A and removed from the stacker 30B without stopping the functioning of the disk drive unit 32.

In brief, in attaining this advantageous operation, it will have been noted that the unit 32 includes the swingable cover 86 and the lifter fingers 102 both actuated by motor 104 by means of cams 106 and 110. The bin 30 is mounted directly over and on top of the unit 32 and consists of the hopper 30A, stacker 30B and the feed rolls 38 (cooperating with bearings 43) for feeding assemblies downwardly and upwardly, into and out of the unit 32. In attaining the advantageous operation, in brief, first the cover 86 is opened, being swung about its pivots 87. The fingers 102 then move a disk assembly 18 upwardly within the slots 74A and 74B to the nips between the rolls 38 and bearings 43. The rolls 38 frictionally engage and move the disk assembly 18 being recovered from the unit 32 all the way into the bin 30, and the flippers 44 move the disk over the rolls 38 and into the stacker 30B. Subsequently, a new disk assembly 18 is loaded into the disk drive 32, with the ledges 40A on the pick rolls 40 moving a disk assembly 18 out of the hopper 30A over the rolls 40 and into the bite between the rolls 38 and bearings 43. The rolls 38 frictionally engage and move the disk assembly 18 downwardly until it is all the way into the disk drive unit 32, resting on the ledges 74C; and then the cam 110 closes the cover 86 so that the disk 20 is gripped between the drive surface 80 and the collet 95. The reading or writing operation on the disk may then proceed. Switches 60, 62 and 64 are provided for detecting loading malfunctions.

The separators 34 effectively isolate the hopper 30A from the stacker 30B. The separators 34 are oscillatable with the pick rolls 40 so as to assure that an assembly 18 moves downwardly into the disk drive unit 32 only from the hopper 30A and moves back only into the stacker 30B. The bottoms 36A and 36B of the hopper 30A and stacker 30B are slanted downwardly as shown so that the disk assemblies 18 slide downwardly in the hopper 30A against the pick rolls 40 and slide downwardly toward the left end of the bin 30 as seen in FIG. 3 when in the stacker 30B. The springs 58 bearing on assemblies 18 in the hopper 30A eliminate the need for a "card weight" in the hopper 30A. The throat knife 56 assures that only a single assembly 18 at a time may move over the pick rolls 40 and into the bite between the rolls 38 and bearings 43.

The reversible drive motor 66, directly driving the feed shaft 39, is the primary impelling mechanism resulting in this advantageous operation. The pick shaft 41 is indirectly driven by means of the gears 70 and 72 and the clutch 68. The clutch 68 is a hysteresis type of clutch so that the shaft 41 and pick rolls 40 may only have about 100° of rotation, being limited by one of the arms 48 contacting the dowels 48A and 48B. The feed rolls 38 are in continuous rotation along with the shaft 39 as long as the motor 66 is energized, and these rolls coacting with the bearings 43 assure the complete upward and downward movement of the assemblies 18 as the assemblies are being moved into and out of the disk drive unit 32.

After a disk 20 is all the way down into the unit 32, the motor 66 reverses and moves the pick rolls 40 and the separators 34 back to their starting positions; and, in these positions, the separators 34 prevent manually inserting disk assemblies 18 into the bites of the rolls 38 and bearings 43 or into the stacker 30B. The lower motor 104 and cam 106 then close the cover 86 which positions the disk 20 and allows it to turn within the envelope 22. Switch 120 actuated by the cam 108 indicates that this portion of the cycle is complete and that the disk 20 is ready for reading or writing. Upon completion of the activity of the disk drive unit 32, the disk 20 will be unloaded by the autoloader. The cover 86 is opened by the lower motor 104 rotating cam 106, and rotation of cam 110 simultaneously takes place so as to move the lifter fingers 102 to lift the assembly 118 in the unit 32 into the nips of the rolls 38 and bearings 43. The height of the envelope 22 is less than the distance between the ledges 74C and the nips between the feed rolls 38 and bearings 43 so that the lever 96 and fingers 102 are required to move the assembly 18 upwardly in a first phase of movement. The rolls 38 are now turning in the opposite direction from that in which they turned for feeding a disk assembly 18 into the unit 32, and the disk assembly 18 thus comes out of the unit 32 and is positioned on the opposite side of the separators 34 and falls in the stacker 30B. The flexible fingers 44 assure that the motion of the assembly 18 is completed over the rolls 38 into the stacker 30B.

It will be noted that the control of the entire assembly is located in the disk drive unit 32. The lower motor 104, in particular, constitutes the control for the entire unit and drives each of the cams 106, 108 and 110 at one revolution per cycle, and a cycle may for example require approximately 5 seconds. All of the cams 106, 108 and 110 rotate together at this one revolution per cycle, and the cam 106 closes the door 86, the cam 110 operates the lifter fingers 102 and the cam 108 operates the control switches 118, 120 and 122 used by the using system for logic purposes. In particular, actuation of the switch 118 reverses the direction of drive of the upper motor 66. By the use of this cam and switch approach, the logical sequential operation of the mechanism is self-contained with only polling of switches 60, 62, 64, 120 and 122 required of the using system. The autoloader and disk drive unit 32 is turned on, or a cycle is started, by the using system which may at this time supply a voltage to the motors 66 and 104, with the lower motor 104 driving the cams 106, 108 and 110 and the upper reversible motor 66 turning the feed rolls 38.

We claim:

1. A recording system utilizing record disks adapted to have information recorded on faces thereof and comprising a stationary support, a drive member rotatably mounted in said support and adapted to have engagement with a record disk for driving the disk for transfer of information to or from the disk, motor means for rotatably driving said drive member and thereby driving a record disk in engagement therewith, means for moving one of said disks onto said drive member prior to an information transfer operation and then off of said drive member after an information transfer operation has taken place and including a friction drive roll located to the side of said drive member and frictionally driving the disk in a direction laterally of the disk, and reversible motor means drivingly connected with said friction drive roll for driving the friction drive roll in one direction or the other so as to thereby move the disk laterally onto and off of said drive member.

2. A recording system as set forth in claim 1, said record disks being of such transverse dimension that they are spaced from said friction drive roll when in driving relationship with said drive member, said recording system including auxiliary disk moving means for moving a disk out of its position for driving by said drive member and back into engagement with said friction drive roll so that the friction drive roll may move the disk completely out of register with respect to said drive member.

3. A recording system as set forth in claim 1 and including a bin for disks located above said drive member and said friction drive roll being located in the bottom of said bin and arranged to move the disks vertically, said disks having a transverse dimension such that they are out of engagement with said friction drive roll when they are in driving relationship with respect to said drive member, said recording system including an auxiliary disk lifting member for lifting a disk from its position in driving relation with respect to said drive member and into engagement with said friction drive roll so that said friction drive roll may raise the disk to move it back into said bin after a recording operation has taken place.

4. A recording system as set forth in claim 3 and including movable means for clamping a said disk onto said drive member after the disk has fallen from said friction drive roll into driving relationship with said drive member, and common motor means for moving said auxiliary lifting member and for moving said movable clamping means so that said clamping means are first unclamped with respect to a disk and then said lifting member is active to move the disk back upwardly into driven relation with said friction drive roll.

5. A recording system as set forth in claim 1, each of said disks being encased in a protective envelope having an opening therethrough for the reception of an information transferring transducer, said stationary support being provided with opposite slots therein for receiving side edges of the protective envelopes when the disk contained in the envelope is in position for driving by said drive member.

6. A recording system as set forth in claim 5 and including a cover hingedly mounted with respect to said stationary support, and a collet rotatably carried by said cover and movable to clamp one of said disks between it and said drive member when the cover is swung toward the drive member so that an information transfer operation may thereafter take place with the disk being so clamped in engagement with said drive member.

7. A recording system as set forth in claim 6, said envelopes being of such transverse dimension that they are spaced from said friction drive roll when in driven relationship with said drive member, said recording system including an auxiliary disk moving member for moving an envelope with a disk therein from a disk driving position with said drive member and into engagement with said friction drive roll so that the friction drive roll may thereafter move the envelope and disk, and common motor means for moving said auxiliary disk moving member and for moving said cover so that said cover is first moved to unclamp a disk with respect to said drive member and then said auxiliary disk moving member is active to move the envelope into driven relation with said friction drive roll.

8. A recording system utilizing record disks adapted to have information recorded on faces thereof and each being contained in a protective envelope, said recording system comprising a stationary support adapted to receive one of said disk containing envelopes in substantially vertical disposition, a drive member rotatably mounted in said support on a substantially horizontal axis and adapted to have engagement with a record disk held by said support by means of the disk envelope for driving the disk for transfer of information to or from the disk, motor means for rotatably driving said drive member and thereby driving a record disk in engagement therewith, a bin located above said stationary support and having a hopper section and a stacker section, driving means associated with said bin for engaging with one of said disk containing envelopes within said hopper section and moving the disk and envelope downwardly into said support for driving engagement of said disk with said drive member, and means for moving the disk and envelope upwardly out of said support and out of engagement with said drive member and back into said bin and into said stacker section thereof after an information transfer operation has been completed.

9. A recording system as set forth in claim 8, said means for moving the disk and envelope downwardly out of said hopper section of said bin and then back again into said stacker section of said bin including a friction roll frictionally engaging the envelope, and a reversible motor for driving said friction roll in one direction for moving the disk and envelope downwardly and in the other direction for moving said disk and envelope upwardly.

10. A recording system as set forth in claim 9, said recording system including a separator within said bin for separating said hopper section from said stacker section and movable under the control of said reversible motor for opening said hopper section to a disk and envelope to allow said friction roll to move the disk and envelope downwardly and movable to a different position for opening said stacker section to allow said friction roll to move the disk and envelope back upwardly and into said stacker section.

11. A recording system as set forth in claim 10, said means for moving a disk and envelope from said hopper section downwardly including a pick roll having a picking surface thereon to engage with the envelope as the pick roll rotates so as to move the disk containing envelope into contact with said friction roll, gearing for connecting said friction roll with said pick roll and releasable clutching means for allowing said pick roll to have less than one revolution of rotation as the pick roll moves from a position moving a disk and its envelope from said hopper section and back again into its original position for picking a subsequent disk and its envelope out of said hopper section.

12. A recording system as set forth in claim 11 and including abutment means for limiting the rotation of said pick roll to less than said one complete revolution, and driving means connecting said pick roll and said separator so that said separator oscillates from its position allowing a disk and envelope to be moved out of said hopper section to its position allowing a returning disk and envelope to move into said stacker section.

13. A recording system as set forth in claim 9 and including a pick roll in driving relationship with said friction roll, said bin having a bottom slanting downwardly from said hopper section to said stacker section and said friction roll and pick roll being located in the bottom of said bin, said pick roll having a ledge for engaging with the bottom edge of a disk containing envelope in said hopper section so as to move this bottom envelope edge over the pick roll and into engagement with said friction roll, a bearing element coaxial with said pick roll and having a nip with respect to said friction roll so that the friction roll is effective to move the disk and envelope downwardly into said support and upwardly therefrom, and a flexible flipper arm rotatable with said friction roll and effective for engaging the bottom edge of a disk containing envelope as the envelope moves upwardly between said friction roll and bearing element so that the flipper arm moves the disk and envelope over the friction roll and into said stacker section.

* * * * *